(12) United States Patent
Sone

(10) Patent No.: US 6,650,854 B2
(45) Date of Patent: Nov. 18, 2003

(54) IMAGE READING APPARATUS THAT HOLDS CARRIAGE AT A READING POSITION

(75) Inventor: Toshihiro Sone, Yokohama (JP)

(73) Assignees: Kabushiki Kaisha Toshiba, Tokyo (JP); Toshiba TEC Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/024,394

(22) Filed: Dec. 21, 2001

(65) Prior Publication Data

US 2003/0118373 A1 Jun. 26, 2003

(51) Int. Cl.[7] .................. G03G 15/00; G03G 15/04; G03G 21/00
(52) U.S. Cl. ....................... 399/211; 399/367
(58) Field of Search ................. 399/210, 211, 399/367, 371

(56) References Cited

U.S. PATENT DOCUMENTS 4,371,254 A * 2/1983 Beery .................. 399/211
5,239,340 A * 8/1993 Kagawa ................ 399/211
6,285,852 B1 * 9/2001 Etoh et al. ............. 399/367

FOREIGN PATENT DOCUMENTS

| JP | 1-44464 | * | 2/1989 |
| JP | 3-144626 | * | 6/1991 |
| JP | 2000-101798 | | 4/2000 |

* cited by examiner

Primary Examiner—Fred L. Braun
(74) Attorney, Agent, or Firm—Foley & Lardner

(57) ABSTRACT

An image reading apparatus includes a scanner and an ADF. The scanner includes a housing having an upper surface which is formed of a document table glass and a through-read glass. The housing contains first and second carriages which can slide along rails. In a through-read mode, the first carriage is moved to a reading position below the through-read glass, and the case of the first carriage is magnetically held by a fixing mechanism, and the first carriage is fixed at a reading position. A vibration-absorbing member is interposed between the fixing mechanism and the case.

15 Claims, 3 Drawing Sheets

IMAGE READING APPARATUS THAT HOLDS CARRIAGE AT A READING POSITION

BACKGROUND OF THE INVENTION

The present invention relates to an image reading apparatus for applying light onto a document and receiving light reflected therefrom to thereby read an image of the document.

There is known an image reading apparatus equipped with an ADF for feeding a document to a document table, and a scanner for reading an image from the document fed to the document table. The scanner includes a carriage movable along rails. The carriage incorporates, for example, a lamp for illuminating a document, and a mirror for transmitting light reflected from the document.

The image reading apparatus operates in the following two modes. In a first mode, a document is fed to the document table and stopped at a predetermined reading position by the ADF, and has its document surface scanned by the scanner while the carriage of the scanner is being moved along the document table. In a second mode, a document is moved onto the document table by the ADF, with the carriage of the scanner stopped at the predetermined reading position, whereby the document surface of the document is scanned.

In the second mode, however, there is a problem in which the vibration of a driving motor for driving the ADF that feeds a document is transmitted to the rails via the housing of the carriage, with the result that the carriage may jump from the rails to thereby vibrate the mirror mounted thereon, which may cause a blur in a resultant read image. This problem is conspicuous when the document feed speed of the ADF is increased to execute high-speed reading.

BRIEF SUMMARY OF THE INVENTION

The present invention has been developed in light of the above, and aims to provide an image reading apparatus capable of reliably reading an image of a document at high speed.

To attain the object, an image reading apparatus according to an embodiment of the invention comprises: a housing having an upper surface which forms a document table; a document feeder attached to the housing to cover the document table, and configured to feed a document to the document table; a carriage provided in the housing such that it can move along the document table, the carriage being provided with a light source which illuminates the document, and an optical member which transmits light reflected from the document; a light receiving element which receives the reflected light transmitted via the optical member; a support member attached to the housing and supporting the carriage such that the carriage can move along the document table; a fixing mechanism which fixes the carriage at a reading position; and a vibration-absorbing member which prevents vibration, generated by a driving section provided for the document feeder, from being transmitted to the carriage.

Furthermore, an image reading apparatus according to the embodiment of the invention comprises: a housing having an upper surface which forms a document table; a document feeder attached to the housing to cover the document table, and configured to feed a document to the document table; a carriage provided in the housing such that it can move along the document table, the carriage being provided with a light source which illuminates the document, an optical member which transmits light reflected from the document, and a case containing the light source and the optical member; a light receiving element which receives the reflected light transmitted via the optical member, and subjects the received light to photoelectric conversion; a rail fixed to the housing, the rail mounting thereon the case of the carriage such that the case can slide along the document table; and an electromagnet which magnetically holds the case of the carriage when the case assumes a reading position while the carriage is sliding along the rail, thereby fixing the carriage at the reading position.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the embodiments given below, serve to explain the principles of the invention.

DETAILED DESCRIPTION OF THE INVENTION

An embodiment of the invention will be described in detail with reference to the accompanying drawings.

Figure 1:
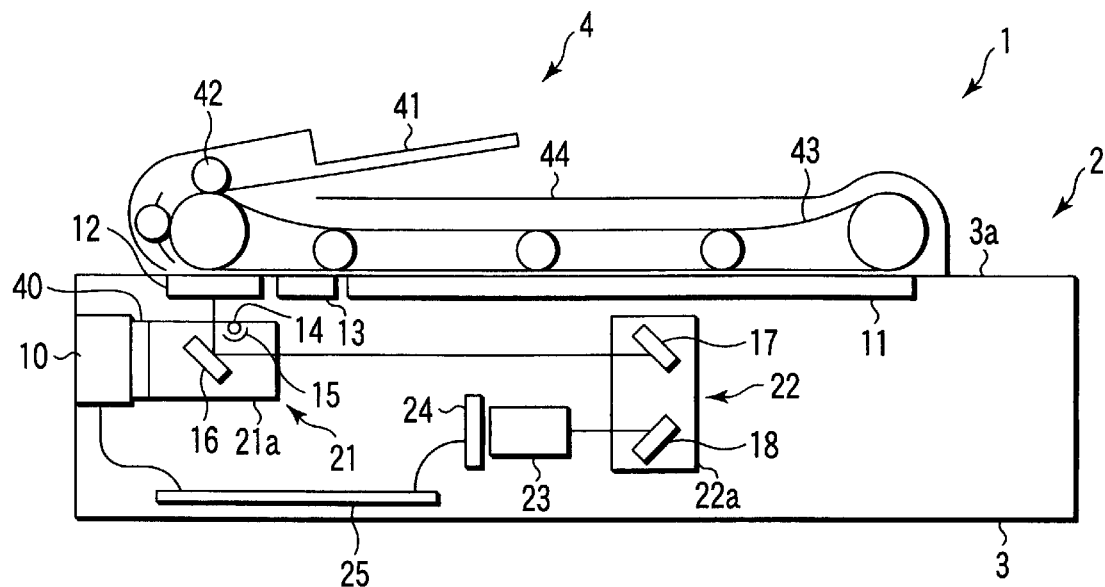
FIG. 1 is a schematic illustrating the configuration of an image reading apparatus according to an embodiment of the invention.

FIG. 1 shows a schematic configuration of an image reading apparatus 1 according to the embodiment of the invention. The image reading apparatus 1 comprises a scanner 2 and an automatic document feeder 4 (hereinafter referred to as an "ADF 4").

The scanner 2 includes a substantially rectangular housing 3. On the upper surface 3a of the housing 3, a document table glass 11 and a through-read glass 12 are provided in parallel to and separate from each other. The document table glass 11 and through-read glass 12 function as the document table of the invention. A shading plate 13 for providing a white reference is interposed between the document table glass 11 and through-read glass 12.

The housing 3 contains first and second carriages 21 and 22 extending in the front-rear direction of the image reading apparatus 1. The first and second carriages 21 and 22 are movable along the document table glass 11 and through-read glass 12 in the left-right direction in the figure.

The first carriage 21 includes a lamp 14 (a light source) for illuminating the document surface of a document (not shown), with the document table glass 11 or through-read glass 12 interposed therebetween; a reflector 15 for converging light, emitted from the lamp 14, to the document surface; a first mirror 16 (an optical member) for deflecting light, reflected from the document surface, to the second carriage; and a case 21a. The case 21a contains the lamp 14, reflector 15 and first mirror 16, all positioned with a high accuracy.

The second carriage 22 includes second and third mirrors 17 and 18 for deflecting light, reflected from the document and deflected by the first mirror 16 of the first carriage 21, to a photoelectric converting element 24 (a CCD sensor 24); and a case 22a containing the accurately-positioned second and third mirrors 17 and 18. The reflected light deflected by the third mirror 18 enters the CCD sensor 24 via a lens 23.

In the sensor, the reflected light entering the CCD sensor 24 is subjected to photoelectric conversion, whereby the CCD sensor 24 outputs image data based on a document image. The image data output from the CCD sensor 24 is supplied to an image forming section (not shown) via a control board 25 incorporated in the image reading apparatus 1.

Figure 2:
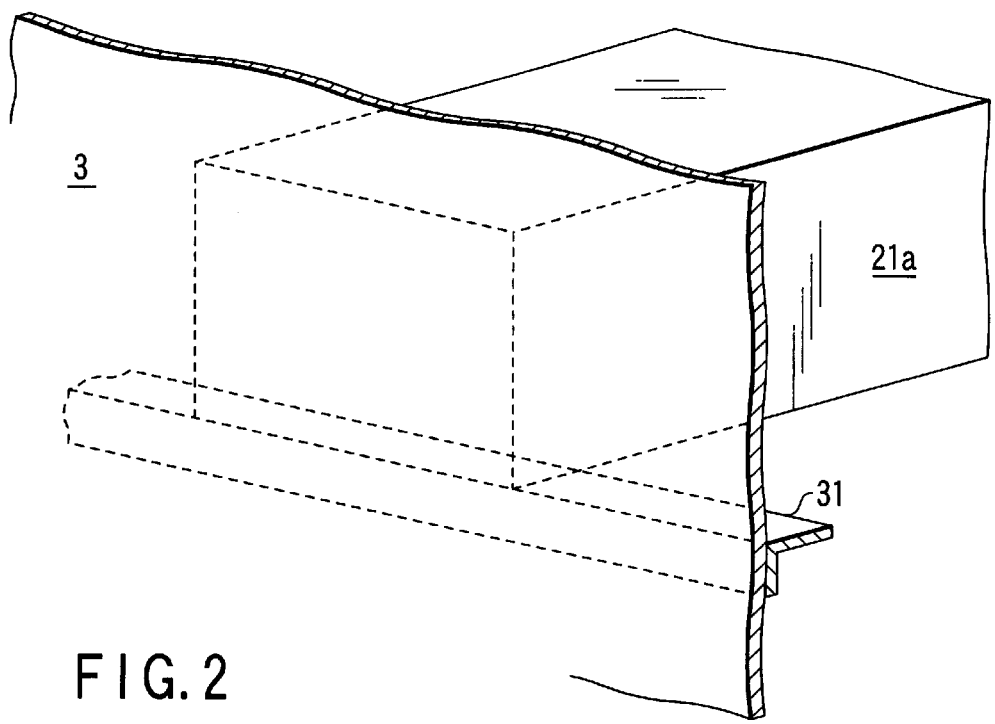
FIG. 2 is a perspective view illustrating a support structure employed in a carriage incorporated in the scanner of the image reading apparatus of FIG. 1.
Figure 3:
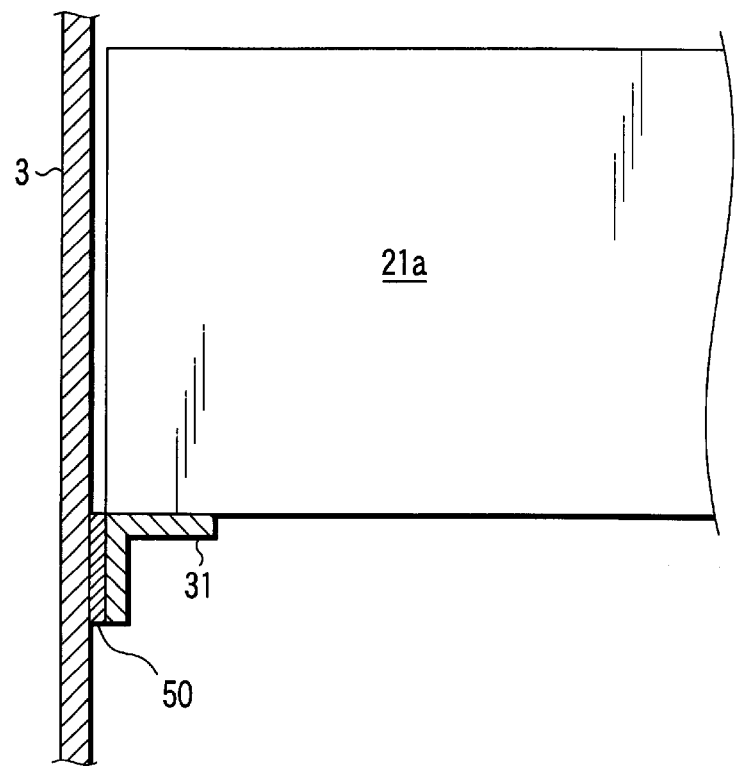
FIG. 3 is a fragmentary enlarged sectional view of the support structure of FIG. 2.

As shown in FIGS. 2 and 3, front and rear end portions of the case 21a of the first carriage 21 are placed on rails 31 attached to the inner walls of the housing 3 (only the front side is shown). The case 22a of the second carriage 22 is also placed on similar rails (not shown). Each rail 31 extends in a direction in which the first and second carriages 21 and 22 are movable.

Further, the first and second carriages 21 and 22 are connected by two wires (not shown) of the same length, which are wound on pulleys (not shown) and tensioned therebetween. One of the wires connects a front end portion of the first carriage 21 to a front end portion of the second carriage 22, while the other wire connects a rear end portion of the first carriage 21 to a rear end portion of the second carriage 22.

In this configuration, when the driving motor 53 of the scanner 2, described later, has been driven to rotate the pulleys (not shown) and wind the wires, the first carriage 21 is moved along the rails 31, and the second carriage 22 moves in accordance with the first carriage 21 along the rails at half the speed of the first carriage 21.

An electromagnet 10 is fixed to the left wall of the housing 3 in the figure. The electromagnet 10 functions as a fixing mechanism for fixing the first carriage 21 at a predetermined reading position below the through-read glass 12. The electromagnet 10 is connected to a power supply 54 (FIG. 4) provided for the control board 25, and generates a magnetic force when a current flows therethrough. The electromagnet 10 is provided at a location at which it magnetically holds the case 21a when the first carriage 21 is moved to the reading position, thereby fixing the first carriage 21 at the reading position.

A vibration-absorbing member 40 is interposed between the electromagnet 10 and the case 21a of the first carriage 21. The vibration-absorbing member 40 is provided for preventing undesirable vibration, transmitted from the ADF 4, from being transmitted to the first carriage 21 via the housing 3. The attachment position of the electromagnet 10 is determined in light of the thickness of the vibration-absorbing member 40.

The ADF 4 comprises a document supply tray 41 on which a plurality of documents can be set at a time; a pickup roller 42 for picking up and feeding, one by one, documents stacked on the document supply tray 41; an endless conveyance belt 43 for conveying documents, picked by the pickup roller 42, over the through-read glass 12 and document table glass 11, the belt being arranged to stop at the predetermined reading position on the document table glass 11; and a document discharge tray 44 for discharging each document conveyed by the conveyance belt 43.

Figure 4:
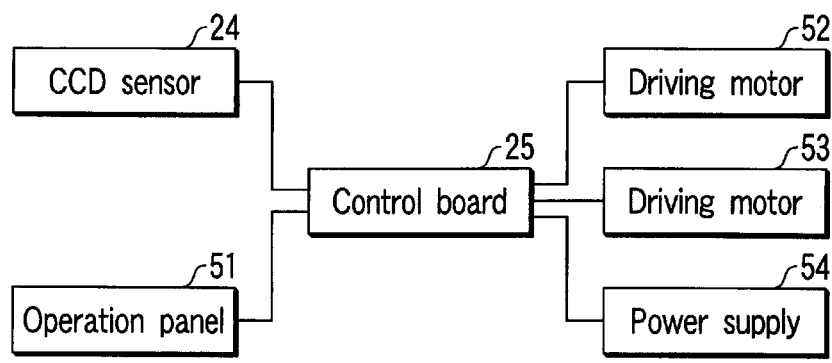
FIG. 4 is a block diagram illustrating a control system for controlling the operation of the image reading apparatus of FIG. 1.

FIG. 4 is a block diagram illustrating a control system for controlling the operation of the image reading apparatus 1 configured as above.

The control board 25 for controlling the operation of the image reading apparatus 1 is connected to, as well as the aforementioned CCD sensor 24, an operation panel 51, a driving motor 52 for moving the conveyance belt 43 of the ADF 4 both forwards and backwards, a driving motor 53 for sliding the first and second carriages 21 and 22 of the scanner 2 along the rails 31, and the power supply 54 for powering the electromagnet 10. The operation panel 51 is provided with a power supply button (not shown) for the image reading apparatus 1, a mode switch button (not shown), and a start key (not shown), etc.

The image reading apparatus 1 configured as above operates in first and second modes. In the first mode, a document is fed to the predetermined reading position on the document table glass 11 and stopped there by the ADF, and has its document surface scanned by the scanner 2 while the first and second carriages 21 and 22 of the scanner 2 are being moved along the document table glass 11. In the second mode, the first carriage 21 of the scanner 2 is stopped at the reading position, thereby stopping, at a predetermined position, the second carriage 22 that moves in accordance with the first carriage 21, and a document is moved over the through-read glass 12 by the ADF. As a result, its document surface is scanned.

Figure 5:
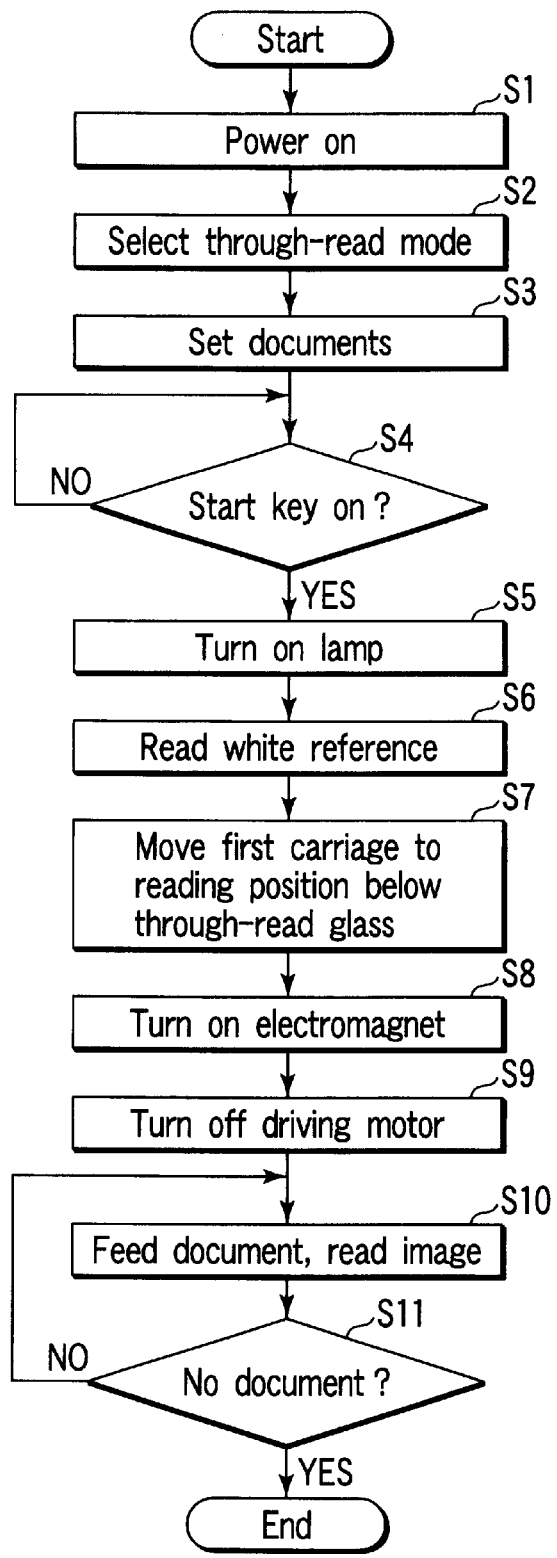
FIG. 5 is a flowchart useful in explaining the operation of the image reading apparatus of FIG. 1.

The operation of the image reading apparatus 1 executed in the second mode will be described in more detail, referring to the flowchart of FIG. 5.

First, an operator pushes the power supply button on the operation panel 51 of the image reading apparatus 1 (step 1), and then pushes the mode switch button of the operation panel 51 to select the second mode, i.e. the through-read mode (step 2).

After the operator sets to-be-read documents on the document supply tray 41 of the ADF 4 (step 3), if the start key on the operation panel 51 is pushed (step 4: Yes), the lamp 14 provided in the first carriage 21 is turned on (step 5), and the driving motor 53 of the scanner 2 is activated, thereby moving the first carriage 21 from its home position to the reading position just below the through-read glass 12 (step 7).

At this time, the lamp 14 of the first carriage 21 illuminates the shading plate 13 to thereby read the white reference (step 6).

While the first carriage 21 is being moved to the reading position, the second carriage 22 moves to a predetermined position in accordance with the first carriage 21.

When the first carriage 21 has reached the reading position, the power supply 54 of the electromagnet 10 is turned on (step 8), whereby the case 21a of the first carriage 21 sticks to the electromagnet 10 due to the magnetic force, with the vibration-absorbing member 40 interposed therebetween, and hence the first carriage 21 is fixed at the reading position. After that, the driving motor 53 of the scanner 2 is turned off (step 9).

Then, the driving motor 52 of the ADF 4 is activated to start the pickup of each document, the documents are sequentially moved over the through-read glass 12, and images of the documents are read (step 10). The reading operation at the step 10 is continued until all documents set on the document supply tray 41 are read (step 11).

As described above, the embodiment employs the electromagnet 10 as a fixing mechanism for fixing the first carriage 21 at the reading position in the through-read mode. For fixing the first carriage 21 at the reading position, another method could be devised where the driving motor 53 of the scanner 2 is kept activated after the first carriage 21 is moved to the reading position. In this method, however, since the driving motor 53 is kept activated during the reading operation of the documents, it may overheat. At worst, the driving motor 53 may break down due to excessive heat. To avoid this, in the embodiment, the driving motor 53 is turned off after the electromagnet 10 fixes the case 21a of the carriage 21.

Moreover, in the embodiment, the vibration-absorbing member 40 is interposed between the electromagnet 10 and the case 21a of the first carriage 21. This prevents undesirable vibration, transmitted from the driving motor 52 of the ADF 4, from being transmitted to the case 21a of the first carriage 21 via the housing 3 of the scanner 2 and the electromagnet 10. The vibration becomes conspicuous as the feeding speed of documents by the ADF 4 increases. The vibration-absorbing member 40 prevents the first carriage 21 from jumping from the rails 31 and hence blurring the resultant read image.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

Although, in the above-described embodiment, the vibration-absorbing member 40 is provided between the electromagnet 10 and the case 21a of the first carriage 21, the invention is not limited to this. For example, as shown in FIG. 3, a vibration-absorbing member 50 may be provided between the housing 3 of the scanner 2 and each rail 31. Also in this case, undesirable vibration caused by the driving motor 52 of the ADF 4 is prevented from being transmitted to the rails 31 via the housing 3, thereby preventing undesirable vibration of the first carriage 21.

In addition, the vibration-absorbing member may be interposed between the ADF 4 and the housing 3 of the scanner 2 so as to prevent the transmission of vibration from the ADF 4 to the housing 3.

What is claimed is:

1. An image reading apparatus comprising:
   a housing having an upper surface which forms a document table;
   a document feeder attached to the housing to cover the document table, and configured to feed a document to the document table;
   a carriage provided in the housing such that it can move along the document table, the carriage being provided with a light source which illuminates the document, and an optical member which transmits light reflected from the document;
   a light receiving element which receives the reflected light transmitted via the optical member;
   a support member attached to the housing and supporting the carriage such that the carriage can move along the document table;
   a fixing mechanism which fixes the carriage at a reading position; and
   a vibration-absorbing member which prevents vibration, generated by a driving section provided for the document feeder, from being transmitted to the carriage.

2. The image reading apparatus according to claim 1, wherein the vibration-absorbing member is provided between the document feeder and the housing.

3. The image reading apparatus according to claim 1, wherein the vibration-absorbing member is provided between the support member and the housing.

4. The image reading apparatus according to claim 1, wherein the support member includes a rail on which the carriage is slidably placed.

5. The image reading apparatus according to claim 4, wherein the vibration-absorbing member is provided between the rail and the housing.

6. The image reading apparatus according to claim 1, wherein the vibration-absorbing member is provided between the fixing mechanism and the carriage.

7. The image reading apparatus according to claim 1, wherein the fixing mechanism includes an electromagnet.

8. The image reading apparatus according to claim 7, wherein the vibration-absorbing member is provided between the electromagnet and the carriage.

9. An image reading apparatus comprising:
   a housing having an upper surface which forms a document table;
   a document feeder attached to the housing to cover the document table, and configured to feed a document to the document table;
   a carriage provided in the housing such that it can move along the document table, the carriage being provided with a light source which illuminates the document, an optical member which transmits light reflected from the document, and a case containing the light source and the optical member;
   a light receiving element which receives the reflected light transmitted via the optical member, and subjects the received light to photoelectric conversion;
   a rail fixed to the housing, the rail mounting thereon the case of the carriage such that the case can slide along the document table; and
   an electromagnet which magnetically holds the case of the carriage when the case assumes a reading position while the carriage is sliding along the rail, thereby fixing the carriage at the reading position.

10. The image reading apparatus according to claim 9, further comprising a vibration-absorbing member which prevents vibration, generated by a driving section provided for the document feeder, from being transmitted to the carriage.

11. The image reading apparatus according to claim 10, wherein the vibration-absorbing member is provided between the document feeder and the housing.

12. The image reading apparatus according to claim 10, wherein the vibration-absorbing member is provided between the rail and the housing.

13. The image reading apparatus according to claim 10, wherein the vibration-absorbing member is provided between the electromagnet and the case of the carriage.

14. The image reading apparatus according to claim 9, wherein the electromagnet is fixed to the housing.

15. An image reading apparatus comprising:
   a housing having an upper surface which forms a document table;

a carriage provided in the housing such that it can move along the document table, the carriage being provided with a light source which illuminates a document, an optical member which transmits light reflected from the document, and a case containing the light source and the optical member;

a light receiving element which receives the reflected light transmitted via the optical member, and subjects the received light to photoelectric conversion;

a rail fixed to the housing, the rail mounting thereon the case of the carriage such that the case can slide along the document table; and a fixing mechanism which magnetically holds the case of the carriage when the case assumes a reading position while the carriage is sliding along the rail, thereby fixing the carriage at the reading position.

* * * * *